(12) United States Patent
Nerot et al.

(10) Patent No.: US 10,862,956 B2
(45) Date of Patent: Dec. 8, 2020

(54) CLIENT-SERVER COMMUNICATION (71) Applicant: IDEMIA FRANCE, Colombes (FR)

(72) Inventors: Sebastien Nerot, Colombes (FR); Rami Wehbi, Colombes (FR); Christian Sieng, Colombes (FR)

(73) Assignee: IDEMIA FRANCE, Colombes (FR)

( * ) Notice: Subject to any disclaimer, the term of this patent is extended or adjusted under 35 U.S.C. 154(b) by 0 days.

(21) Appl. No.: 15/537,987

(22) PCT Filed: Dec. 18, 2015

(86) PCT No.: PCT/EP2015/080660
§ 371 (c)(1),
(2) Date: Jun. 20, 2017

(87) PCT Pub. No.: WO2016/102405
PCT Pub. Date: Jun. 30, 2016

(65) Prior Publication Data
US 2017/0353540 A1 Dec. 7, 2017

(30) Foreign Application Priority Data
Dec. 22, 2014 (EP) .................................... 14307121

(51) Int. Cl.
*G06F 15/16* (2006.01)
*H04L 29/08* (2006.01)
(Continued)

(52) U.S. Cl.
CPC ............ *H04L 67/1008* (2013.01); *G06F 9/54* (2013.01); *H04L 67/325* (2013.01); *H04L 67/42* (2013.01)

(58) Field of Classification Search
CPC ........................... H04L 67/1008; H04L 67/42
See application file for complete search history.

(56) References Cited

U.S. PATENT DOCUMENTS

| 7,000,019 B2 * | 2/2006 | Low | G06Q 20/40 455/2.01 |
| 7,594,022 B2 * | 9/2009 | Warren | H04L 51/30 709/227 |

(Continued)

FOREIGN PATENT DOCUMENTS

EP    1 739 554 A1    1/2007

OTHER PUBLICATIONS

International Search Report, dated Feb. 16, 2016, from corresponding PCT/EP2015/080660 application.
(Continued)

Primary Examiner — Hua Fan
(74) Attorney, Agent, or Firm — Nixon & Vanderhye (57) ABSTRACT

A server includes a first server configured to receive requests and a plurality of second servers configured to service requests. A method of client-server communication includes receiving, at the first server, a request from the client and allocating the request to one of the second servers. The server determines if the allocated second server can provide a response to the request within a predetermined time period. If the allocated second server cannot provide a response to the request within the predetermined time period it sends a reply to the client indicating when the server system can provide a response to the request and including an identifier of the allocated second server. Server generates a response to the request. Server receives a callback message from the client. Server sends the response to the client.

19 Claims, 5 Drawing Sheets

(51) Int. Cl.
*G06F 9/54* (2006.01)
*H04L 29/06* (2006.01)

(56) References Cited

U.S. PATENT DOCUMENTS

| | | | |
|---|---|---|---|
| 9,154,549 B2* | 10/2015 | Sundararaj | G06F 9/505 |
| 2002/0046281 A1* | 4/2002 | Cope | G06F 11/3438 |
| | | | 709/227 |
| 2004/0103194 A1 | 5/2004 | Islam et al. | |
| 2008/0189350 A1 | 8/2008 | Vasa et al. | |
| 2011/0119326 A1* | 5/2011 | Jolfaei | H04L 67/02 |
| | | | 709/203 |
| 2011/0161488 A1* | 6/2011 | Anderson | H04L 47/10 |
| | | | 709/224 |

OTHER PUBLICATIONS

Office Action issued in European Patent Application No. 14 307 121.5 dated Nov. 13, 2019.

* cited by examiner

CLIENT-SERVER COMMUNICATION

BACKGROUND

Various situations require a client device to communicate with a server. For example, a client device may send a request to a server to query a database or to retrieve data stored at the server, such as user data or application data, new application software or a software update.

Typically, a device sends a request to a server and then waits for a response. If the server is too busy to deal with the request, the request may 'time out' after a period of time. The process running on the client device that sent the request may signal the 'time out' back to the user, or the process may resend the request before signalling the time out to the user.

When the client device is a mobile device there is a further complication that a communication link between the client device and the server may be lost during the period of waiting for a reply from the server. This requires the client device to resend the request.

The above experience of client-server communication can be frustrating for a user and can make inefficient use of resources at the client device and/or server.

SUMMARY

An aspect of the invention provides a method of communication between a client and a server system, the server comprising a first server configured to receive requests and a plurality of second servers configured to service requests, the method comprising at the server system:
  receiving, at the first server, a request from the client;
  allocating the request to one of the second servers;
  determining if the allocated second server can provide a response to the request within a predetermined time period, and
  if the allocated second server cannot provide a response to the request within the predetermined time period:
    sending a reply to the client, the reply indicating when the server system can provide a response to the request and comprising an identifier of the allocated second server;
    generating a response to the request;
    receiving a callback message from the client, the callback message comprising the identifier of the allocated second server;
  and
    sending the response to the client.

The reply may indicate at least one of: a minimum waiting time period; a time of sending the reply and a minimum waiting time period; and an actual earliest time at which a reply will be available.

The reply may indicate a latest time until which a reply will be available.

The reply may comprise an information element identifying the request and the callback message includes the information element.

The determining may be performed by the first server using data indicative of load or waiting times at the second servers.

The determining may be performed by the allocated second server using data indicative of load or waiting time at the allocated second server.

The method may comprise closing a communication session with the client after sending the reply to the client.

The method may vary the number of the second servers based on load or waiting times at the second servers. For example, one or more additional second servers can be added if load and/or wait times increase beyond a predetermined limit. Similarly, one or more of the in-service second servers can be taken out of service if load and/or wait times decrease beyond a predetermined limit to save power.

There are various options for the timing of generating the response relative to receiving the callback message. In one example, the second server may generate the response to the request during the period between sending the reply to the client and receiving the callback message from the client. In another example, the second server may generate the response to the request after receiving the callback message from the client.

Another aspect of the invention provides a method of communication between a client and a server system, the server system comprising a first server configured to receive requests and a plurality of second servers configured to service requests, the method comprising, at the client:
  sending a request to the server system;
  receiving a reply from the server system, the reply indicating when the server system can provide a response to the request and comprising an identifier of the second server which has been allocated to service the request;
  waiting until the allocated second server can provide a response to the request;
  sending a callback message to the allocated second server; and
  receiving a response to the request.

The reply from the server may comprise at least one of: a minimum waiting time period; a time at which the server sent the reply and a minimum waiting time period; and an actual earliest time at which a reply will be available.

The reply may indicate a latest time until which a reply will be available and the method may comprise contacting the server with a callback message before the latest time.

The reply may comprise an information element which identifies the request and the callback message includes the information element.

The method may further comprise: opening a communication session before sending the request to the server system; closing the communication session after receiving the reply from the server system; and opening a communication session before sending the callback message to the second server.

Another aspect of the invention provides server apparatus comprising a first server and a plurality of second servers, each of the servers comprising a processor and a memory, the memory containing instructions executable by the processor whereby the apparatus is configured to:
  receive, at the first server, a request from the client;
  allocate the request to one of the second servers;
  determine if the allocated second server can provide a response to the request within a predetermined time period, and
  if the allocated second server cannot provide a response to the request within the predetermined time period:
    send a reply to the client, the reply indicating when the server system can provide a response to the request and comprising an identifier of the allocated second server;
    generate a response to the request;
    receive a callback message from the client, the callback message comprising the identifier of the allocated second server;
  and
    send the response to the client.

Another aspect of the invention provides a client apparatus comprising a processor and a memory, the memory containing instructions executable by the processor whereby the apparatus is configured to:
send a request to the server system;
receive a reply from the server system, the reply indicating when the server system can provide a response to the request and comprising an identifier of the second server which has been allocated to service the request;
wait until the server can provide a response to the request;
send a callback message to the second server; and
receive a response to the request.

An advantage of at least one embodiment is that a client device receives a clearer indication of how long it will take the server to service the request. This provides an application running on the client device and/or a user of the client device with more certainty as to when the request will be serviced. The number of time outs can be reduced as typically a client device will either receive a reply to the request from the server, or the client device will receive an indication of when the request will be serviced before a time out occurs. This can reduce user frustration and can allow more efficient use of resources at the client device.

An advantage of at least one embodiment is that the server can more efficiently handle a large number of requests.

An advantage of at least one embodiment is that the number of open communication sessions can be reduced.

An advantage of at least one embodiment is that a mobile client device is less likely to experience a dropped connection during the waiting period for server to respond, as the waiting period will be shorter.

The functionality described here can be implemented in hardware, software executed by a processing apparatus, or by a combination of hardware and software.

The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described or claimed methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
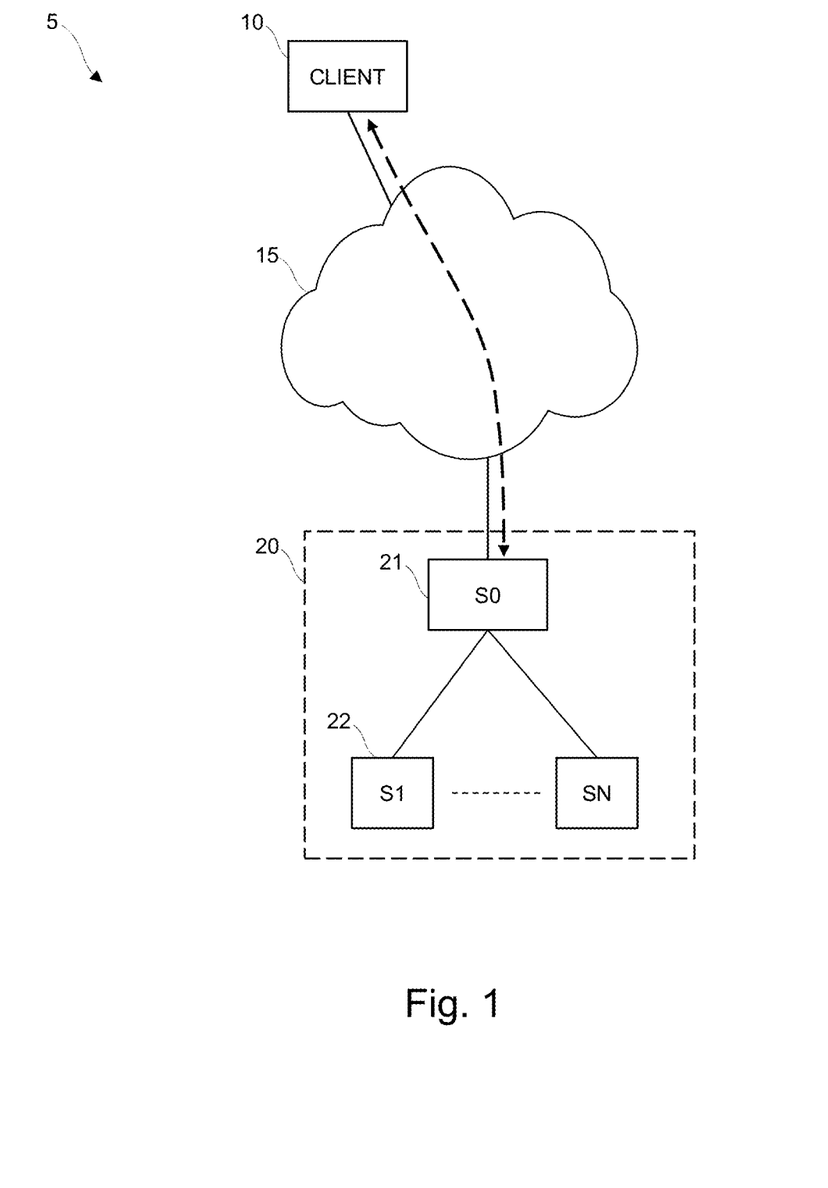
FIG. 1 shows a client-server communication system.

FIG. 1 shows an example of a communication system 5 comprising a client device 10, a server 20 and a communication network 15 which connects the client 10 to the server 20. The client device 10 may be a fixed or mobile device. The client device 10 may be a wireless device. The communication network 15 can comprise one or more networks, such as a local area network or a wide area network. The communication network can comprise wired and/or wireless networks. The server 20 is a server system comprising a first server S0 and a plurality of second servers S1-SN. Server 20 can be a web server and communication network 15 can comprise the Internet.

In the example server 20 shown in FIG. 1, server S0 receives requests from client devices 10 and has a role of a 'dispatcher', dispatching the requests to a suitable one of the servers S1-SN. Servers S1-SN service the requests and provide a reply to the client device 10. Servers S1-SN can be called treatment servers. Although FIG. 1 shows a single client device 10, it will be understood that a typical system 5 can comprise a large number of client devices 10. Communication between the client device 10 and server 20 can use any suitable protocol, such as Transport Control Protocol/Internet Protocol (TCP/IP), Hypertext Transfer Protocol (HTTP), Hypertext Transfer Protocol Secure (HTTPS), User Datagram Protocol (UDP), Short Message Service (SMS), email.

Figure 2:
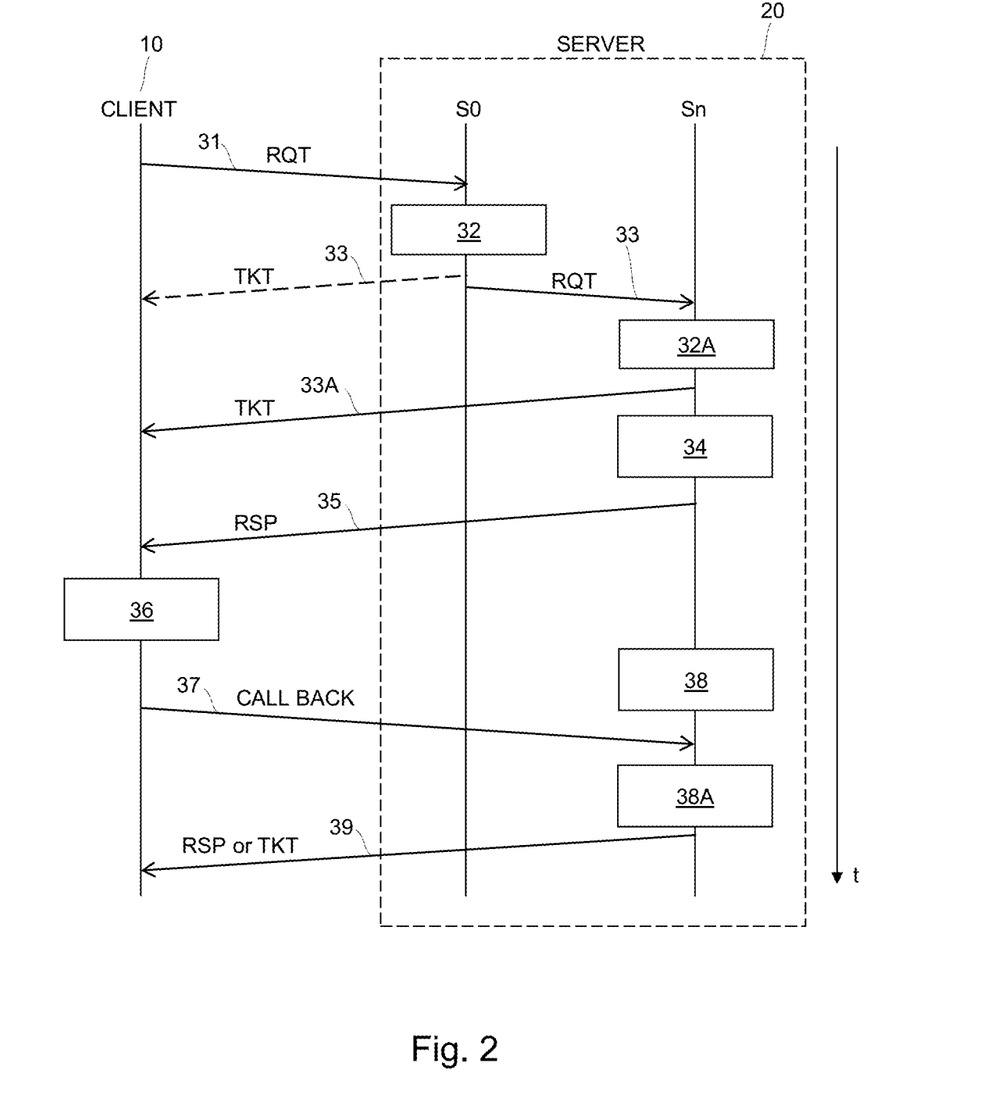
FIG. 2 shows an example of client-server communication in the system of FIG. 1.

FIG. 2 shows an example of client-server communication in the system of FIG. 1. A client device 10 sends a request RQT 31 to the server system 20. The request RQT is received at server S0. Server S0 has the role of a dispatcher. Server S0 is configured to allocate the request to one of the second servers S1-SN and is configured to forward 33 the request on to one of the servers S1-SN that can service the request. FIG. 2 generally shows a request RQT forwarded to a server Sn, where n=1, . . . N. Server S0 may access a data structure comprising the names of the services it can despatch and the addresses of the server or servers to which they can be dispatched.

The server system determines 32, 32A if the allocated second server Sn can service the request within a predetermined time period. This determination may be made by dispatch server S0 (block 32) or by the server Sn (block 32A), after server Sn has received the request from server S0. Server S0 may access a data structure holding an indication of how busy each server S1-SN is. The data structure may hold an indication of an expected wait time at server S1-SN. Server S0 may use this data structure to perform the determination at block 32 of whether it can service the request within a predetermined time period. In a simplest form, server S0 may use a First In First Out (FIFO) queue to store requests received from client devices 10. If the determination of whether the allocated server Sn can service the request within a predetermined time period is made locally at the server Sn, server Sn can store information indicative of wait time.

If the server S0 or server Sn determines at block 32, 32A that it cannot provide a response to the request within the predetermined time period, the server system 20 sends a reply 33, 33A to the client indicating when the server expects that it can provide a response to the request. This reply will be called a "ticket" in this disclosure. The client device 10 receives the ticket. The ticket provides the client device 10 with a much quicker, and more certain, indication of any delay to servicing the request compared to a conventional 'time out'. In a conventional arrangement, a time out may occur due to the server being too busy to service the request. The server system 20 may hold the request as a pending request. This can avoid the need for the client to send the request again. The ticket may comprise an information element which identifies the request. In examples described below, this information element is called a "service-id" 61. The service-id can serve as a placeholder in a queue of the server Sn, identifying that a client device has made a request. If the client device includes the service-id in the callback message, it can allow the server Sn to match the callback with the place in the queue.

If the request can be serviced within the predetermined time period, the request is processed by server Sn and a response is prepared at block 34. The response RSP 35 is sent to the client 10. Block 34 may comprise: performing a query to a database to obtain data for the response RSP; retrieving data from storage, such as one or more files; or streaming data from storage. Advantageously, the response 35 is sent directly to the client device 10 without further involvement of server S0.

The client device 10 waits 36 for a period of time based on the time indicated in the ticket received from the server. The client device sends a callback message 37 to the server after waiting 36 for the period of time based on the time indicated in the ticket received from the server. The callback message 37 can be sent directly to the server Sn handling the request. For example, the ticket TKT may indicate a "replyto" address of server Sn assigned the request, and the callback message can be sent to that address without further involvement of server S0. The callback message 37 may include the same information element ("service-id" field 61) which was sent in reply 33, 33A. This allows the server Sn to match the callback made by the client device with their earlier request. In effect, the "serviceID" is a way of identifying a place held in the queue of server Sn and of matching the later callback message with that place in the queue.

Server Sn generates a response to the request at block 38. In a similar manner as described above for block 34, block 38 may comprise performing a query to a database to obtain data for the response RSP, or may retrieve data from storage, such as one or more files. Server Sn receives the callback message 37 from the client device 10. Server Sn sends a response 39 to the client device 10. Optionally, if the server Sn is still not ready to send the response within a predetermined time period, the server Sn can send another ticket TKT 39 to the client device 10. For example, this may occur if the server receives high-priority requests in the time period between sending the first ticket 33A and receiving the callback message 37.

There are various ways in which the server 20 can indicate when it expects to provide a response to the request. In one example, the server can indicate a time of sending the ticket and a minimum waiting time period. The client device receives the ticket and schedules a time for sending the callback message based on the information received in the ticket. In another example, the ticket can indicate an actual time at which it expects to service the request (e.g. in hrs:mins:secs format or some other suitable timing format). The client device receives the ticket and schedules a time for sending the callback message based on the information received in the ticket. In another example, the ticket can indicate a minimum waiting time period (e.g. X seconds). In a simplest case, the client device can simply schedule a time for sending the callback message at X seconds from the time of receiving the ticket.

FIG. 2 schematically shows the server 20 generating the response at block 38 before receiving the callback message 37. There are various options for the timing of block 39 relative to the callback message 37. Server Sn can generate the response when it has sufficient processing resources, in the expectation of receiving the callback message 37. Block 34 may enter the request into a queue of requests. The server Sn retrieves the request from the queue when it has sufficient processing resources, processes the request and stores results of the request until the callback message is received from the client device 10. In this option, the server Sn may generate the response to the request during the period between sending the reply (ticket) to the client device and receiving the callback message 37 from the client device. This option is best-suited to a request such as a database query, or retrieval of a relatively small amount of data, rather than large file retrieval or data streaming.

In another possible option, server Sn may wait until it receives the callback message 37 before processing the request. This is shown as block 38A. Optionally, server Sn may schedule resources to process the request at around the expected time of the callback message.

In any of these options, server Sn may store the actual parameters of the request. This can avoid the need for the client device to resend the request at the time of the callback message. Instead, the callback message only needs to contain an identifier which allows the server Sn to match the callback message with the original request that it holds.

Figure 3:
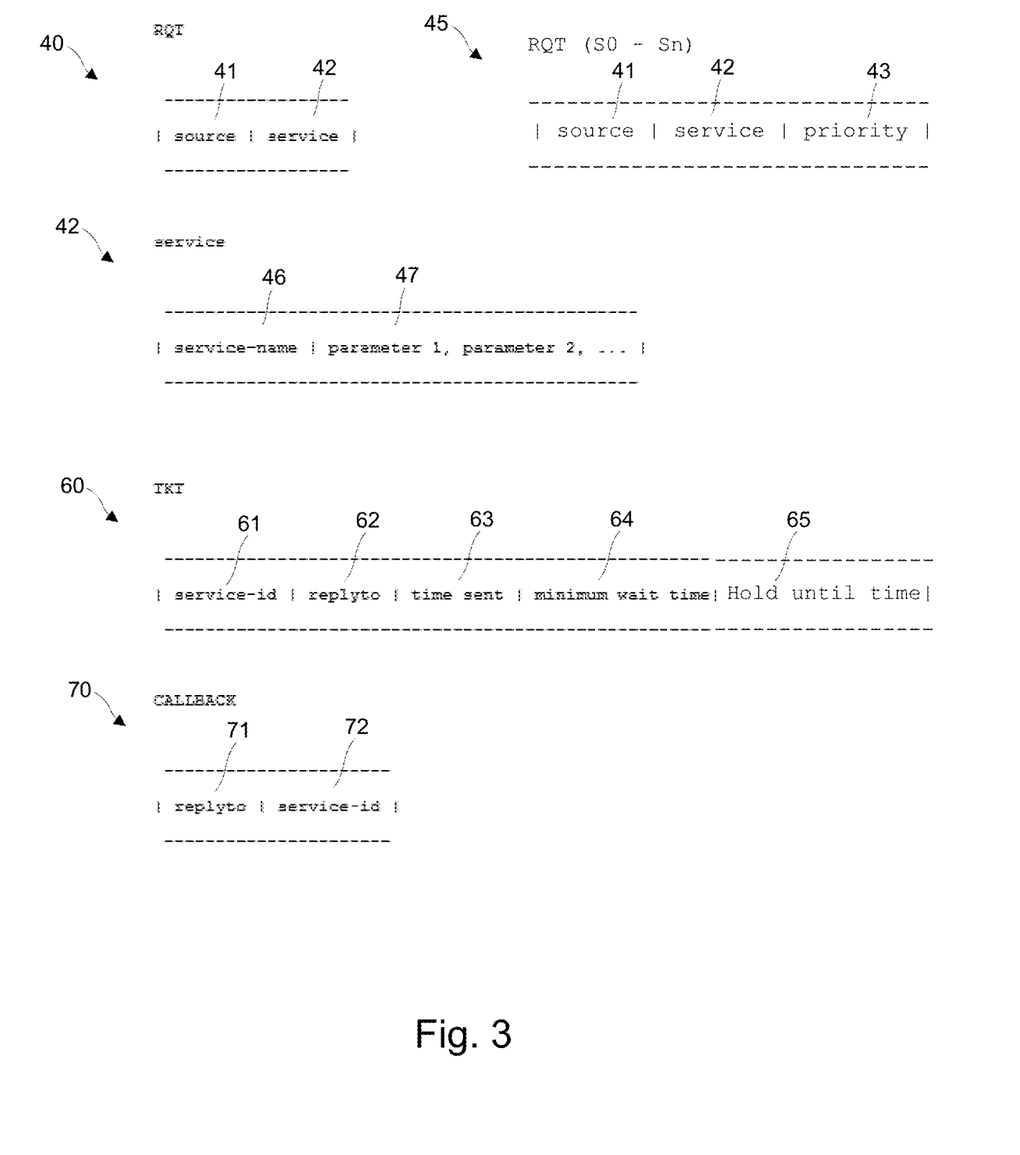
FIG. 3 shows example message formats.
Figure 4:
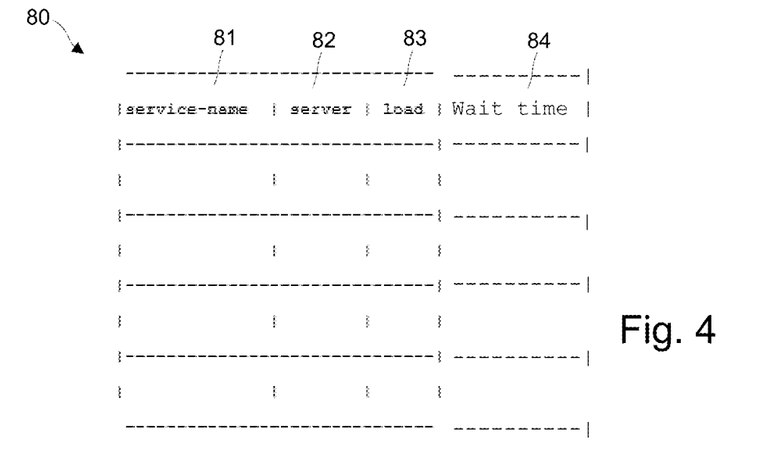
FIGS. 4 to 6 show example queue structures.

FIGS. 3 to 6 show various messages which can be used in the system of FIG. 1, or the method of FIG. 2. FIG. 3 shows an example of a request message RQT 40 comprising: a "source" field 41 indicating a source of the request (e.g. an address of client device 10) and a "service" field 42 which includes detail of the request. An example format of the service field 42 is shown as a data structure comprising a "service-name" field 46, and one or more parameters 47 of a request. In a server system comprising a dispatch server S0 and treatment servers S1-SN, the request message RQT is forwarded from S0 to one of the treatment servers S1-SN. FIG. 4 shows an example of a request message RQT 45 sent from server S0 to server Sn. The request message RQT 45 can be identical to the message RQT 40, or it can contain one or more additional fields. FIG. 3 shows an additional field "priority" 43 which can be used to prioritise the request.

FIG. 3 also shows an example of a ticket message TKT 60 comprising: a "service-id" field 61; a "replyto" field 62; a "time sent" field 63, a "minimum wait time" field 64 and a "hold until time" field 65. The "service-id" field 61 can be an information element which allows the server to match a pending request to a callback made by a client device. Advantageously, a client device includes the "service-id" field in their callback message 70, and this allows the server to match the callback to the pending request. The "replyto" field 62 can specify an address (e.g. a Uniform Resource Identifier, URI) to which the client device should send a callback message. In a system comprising multiple servers, it can allow a callback to be sent directly to the server assigned to processing the request. The "time sent" field 63 can indicate the time at which the ticket TKT was sent by the server. The "minimum wait time" field 64 can indicate a minimum time to service the request. The minimum wait time can be the minimum wait time calculated from the time indicated in the "time sent" field 63. The "hold until time" field 65 can indicate the latest time until which the server will store a response to the request. The "hold until time" can be calculated from the time indicated in the "time sent" field 63.

FIG. 3 also shows an example of a callback message 70 comprising: a "replyto" field 71 and a "service-id" field 72. These fields have been described above. The "replyto" field 71 indicates a destination of the callback message, and can be used to route the message to a particular server Sn assigned to processing the request. The "service-id" field 72 is an identifier which allows the server to match the callback message to the original request.

FIG. 4 shows an example of a data structure 80 held at a despatch server S0. The data structure 80 comprises a "service-name" column 81, a "server" column 82, a "load" column 83 and a "wait time" column 84. Entries in the "service name" and "server" columns allows server S0 to direct a request to a server which is capable of processing that request. The "load" column indicates a loading of each server and allows the server S0 to direct requests to a server S1-SN which can most efficiently process the request. For example, the server S0 may direct the request to the server which has the least load. The "wait time" column indicates a wait time at each server and allows the server. If this column is present, the server S0 can make the determination (32, FIG. 2) of whether a request can be serviced within a predetermined time period, and can send a TKT message to a client if the request cannot be serviced within the predetermined time period. The data structure may not hold all of the information shown in FIG. 4. For example, if each server S1-SN is capable of servicing each type of request, the "service-name" column is not required. If the server S0 is not required to send a ticket TKT to a client, then column 84 is not required. Server S0 may poll servers S1 to SN to update the "load field" and/or "wait time" fields 84.

Figure 5:
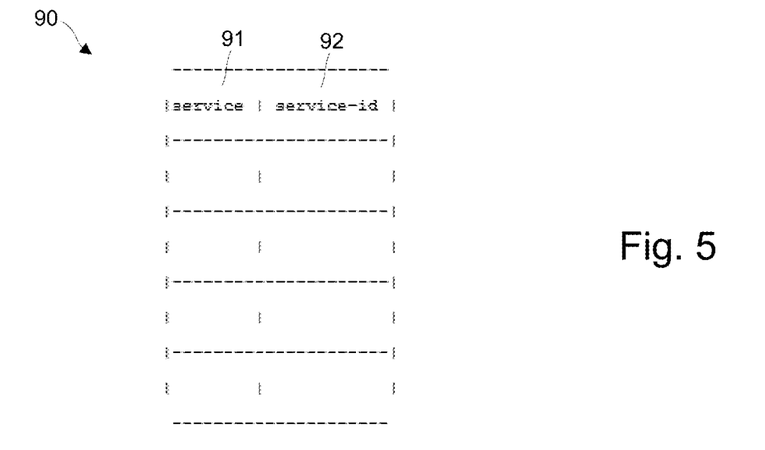

FIG. 5 shows an example of an input queue 90 at one of the servers Sn. The input queue holds entries comprising a "service" 91 and a "service-id" 92. The "service" is shown in FIG. 3. The "service-id" 92 is an identifier which can be allocated by the server Sn, or by the server S0. It identifies the particular request and allows server Sn to match a callback to the request. Optionally, the input queue can store the request RQT 40, 45 alongside the service-id 92, or can store the request RQT 40, 45 in another data structure which is referenced to the input queue by the service-id 92. This avoids the need for the client device to resend the request RQT at the time of sending the callback message 37.

Figure 6:
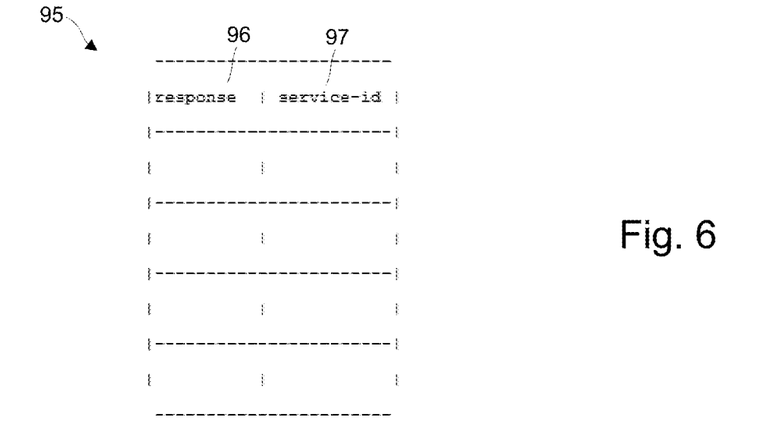

FIG. 6 shows an example of an output queue 95 at one of the servers Sn. The output queue holds entries comprising a "response" 96 and a "service-id" 97. The "response" 96 is the data which needs to be sent to the client device. The "service-id" 97 is an identifier which identifies the particular request and allows server Sn to match a callback to the request.

As described above, the client device 10 may receive a ticket 60 which indicates "time sent" and "minimum wait time". The client device 10 can use this information to schedule a time for sending a callback message. In many systems, the client device 10 and the server 20 will have access to a common timing reference, and therefore the "time sent" will have been calculated by the server according to the same time reference as the client device will use to calculate the time for sending the callback message. An alternative scheme is for the ticket to only send a "minimum wait time" 64 without any "time sent" field. This will not provide the client device with any indication of from what time the "minimum wait time" was calculated. In a further alternative scheme the ticket can comprise a field indicating an "earliest time at which a reply will be available". This can be specified as an actual time, e.g. 13:01:45 in hours:minutes:seconds format. In this alternative, the "minimum wait time" and/or "time sent" may not be sent. The transport time between server and client device may be unknown to the client device and/or the server. The "minimum wait time" or "earliest time at which a reply will be available" are calculated based on load at the server 20. If the client device knows the client device-server transport time then it can factor this into the timing of the callback to the server. To accommodate for a situation where the client and server are located in different time zones, the indication of time sent by the server 20 in the ticket can use a Universal Time Code (ISO 8601), e.g. 2014-03-01T13:00:00Z. The client device can then determine a period of time to wait based on the time indicated in the ticket, and can determine any offset which is needed due to different time zones of the client device relative to the server.

Some advantages of at least one example will now be described. Consider a conventional arrangement where a client device sends a request and waits for a response. There is one continuous communication session.

r: time taken by send request from client device to server

S: time taken by server to generate response (including queuing time)

p: time taken to send response from server to client device rrrrSSSSSSSSSSSSSSSSSSSSSSSSSSSSSSSSSSSSSSSSSS-SSSSSSSSSSSSSSSSS SSSSSSSSSpppp Under the arrangement described above, there are now two much short shorter communication sessions:

r: time taken by send request/reply to ticket from client device to server k: time taken to send ticket from server to client device p: time taken to send response from server to client device session 1: rrrrkkkk session 2: rrrrpppp From the point of view of the client device, the new arrangement gain reduces the chance of a broken connection while waiting for a response from the server. From the point of view of the server, the new arrangement reduces the number of simultaneous connections to client devices that must be held open at any one time. The new arrangement allows the server S0 to end any session where a ticket TKT is sent. If the "replyto" field of the ticket TKT is the address of a server that "sits on" the output queue, then response times can be reduced to a minimum. The callback message from the client device is routed directly to the results queue and the despatch server S0 does not have to participate in the callback session.

Uncoupling service dispatch and treatment allows the system to scale more easily. New treatment servers Sn can be added with minimal change to the system. The presence of the new server Sn can be added to the data structure 80 held by the despatch server S0 (FIG. 4). This uncoupling also makes load balancing easier. If a particular service is heavily loaded, additional servers can be added to support that service. In general, the number of the servers S1-SN may vary based on load or waiting times at the second servers. For example, one or more additional servers S1-SN can be added if load and/or wait times increase beyond a predetermined limit. Similarly, one or more of the in-service servers S1-SN can be taken out of service if load and/or wait times decrease beyond a predetermined limit to save power.

An optional feature of the system described above is to prioritise requests. FIG. 3 shows how the request message RQT 45 sent from despatch server S0 to a server Sn can include a priority indicator 43. Server S0 can select a value of the priority indicator as a function of the source the traffic is received from, i.e.: priority indicator=f(source). This function can be defined as a table held on, or accessible to, server S0. A server Sn can prioritise requests on the basis of one or more of: (i) the arrival time of the message at server; (ii) priority of the message.

Figure 7:
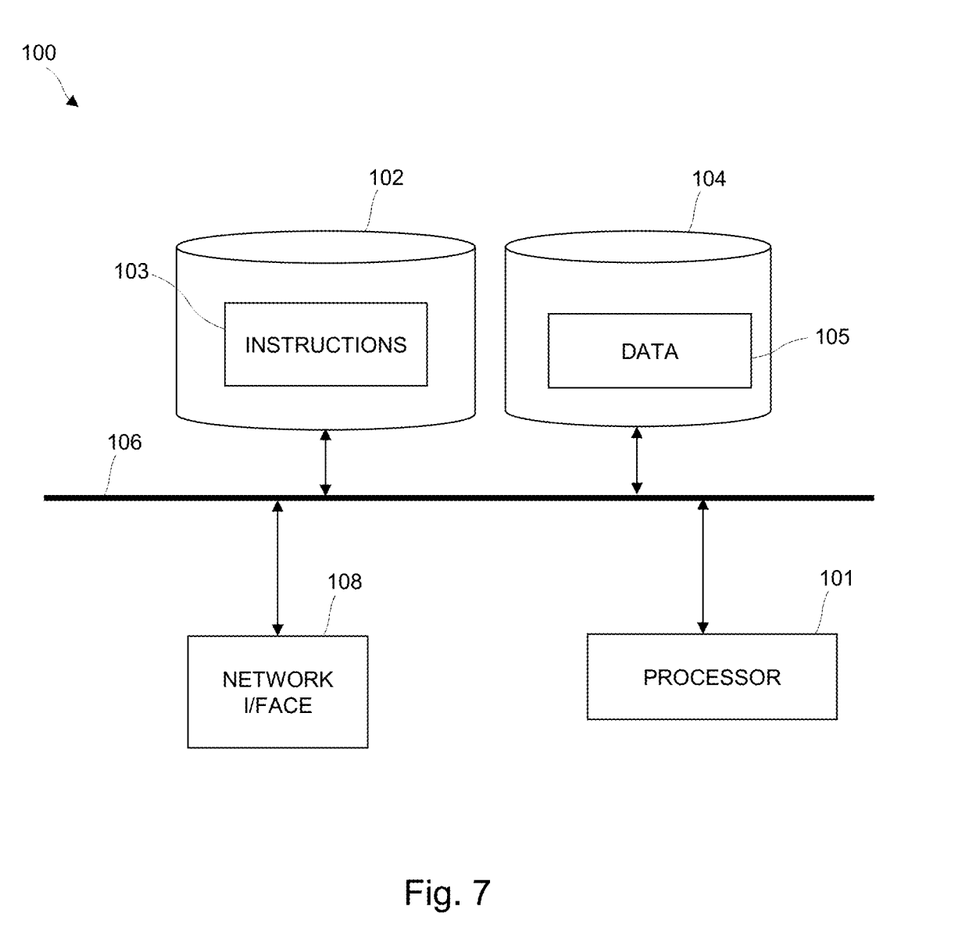
FIG. 7 shows apparatus for a computer-based implementation.

FIG. 7 shows an example of processing apparatus 100 which may be implemented as any form of a computing and/or electronic device, and in which embodiments of the system and methods described above may be implemented. Processing apparatus 100 can be provided at the client device 10 or at one of the servers S0, Sn, forming part of server 20. Processing apparatus may participate in the method shown in FIG. 2. Processing apparatus 100 comprises one or more processors 101 which may be microprocessors, microcontrollers or any other suitable type of processors for executing instructions to control the operation of the device. The processor 101 is connected to other components of the device via one or more buses 106. Processor-executable instructions 103 may be provided using any computer-readable media, such as memory 102. The processor-executable instructions 103 can comprise instructions for implementing the functionality of the described methods. The memory 102 is of any suitable type such as read-only memory (ROM), random access memory (RAM), a storage device of any type such as a magnetic or optical storage device. Memory 102, or an additional memory 104, can be provided to store data 105 used by the processor 101. The data 105 can comprise data which is required to service requests, such as a database which is queried, a store of files for streaming to clients, a store of files available for delivery to clients. The processing apparatus 100 comprise one or more network interfaces 108, such as an interface for client-server communication or an interface for communicating between servers S0 and Sn.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of communication between a client and a server system, the server system comprising a first server configured to receive requests and a plurality of second servers configured to service requests, the method comprising at the server system:
   receiving, at the first server, a request from the client to obtain requested data;
   allocating, by the first server, the request to one of the second servers;
   determining, by the first server or the allocated second server, if the allocated second server can provide the requested data in response to the request within a finite predetermined time period,
   when the determining steps determines that the allocated second server can provide the requested data in response to the request within the predetermined time period, sending, by the allocated second server, the requested data in response to the request to the client, and
   when the determining steps determines that the allocated second server cannot provide the requested data in response to the request within the predetermined time period:
   i) sending, by the first server or the allocated second server, a reply to the client, the reply not comprising the requested data, the reply indicating a time at which the server system can provide the requested data and comprising an information element identifying the request;
   ii) holding, at the allocated second server, the request as a pending request,
   generating, by the allocated second server, a response to the pending request, said response including the requested data as soon as the allocated second server can provide said data, and
   storing, at the allocated second server, said response together with the information element identifying the request respectively associated with said response;
   iii) receiving, at the allocated second server, after a period of time that is based on the time indicated in the reply, a callback message from the client, the callback message not comprising the request, the callback message comprising the information element identifying the request,
   wherein said callback message is received after the response has been generated and stored by the allocated second server; and
   iv) matching, at the allocated second server, the callback message with the generated response by comparing the information element identifying the request comprised in the callback message and the information element identifying the request respectively associated with said generated response, retrieving, based on said matching, the requested data from the generated response, and
   sending, by the allocated second server, the requested data to the client.

2. The method according to claim 1, wherein the time when the server system can provide the requested data included in the reply indicates at least one of:
   a minimum waiting time period;
   a time of sending the reply and a minimum waiting time period; and
   an actual earliest time at which the requested data will be available.

3. The method according to claim 2, wherein the time when the server system can provide the requested data included in the reply indicates a latest time until which the requested data will be available.

4. The method according to claim 2, wherein the reply and then the callback message comprise an identifier of the allocated second server.

5. The method according to claim 2, wherein determining if the allocated second server can provide the requested data in response to the request within the predetermined time period is performed by the first server using data indicative of load or waiting times at the second servers.

6. The method according to claim 1, wherein the time at which the server system can provide the requested data included in the reply indicates a latest time until which the requested data will be available.

7. The method according to claim 6, wherein the reply and then the callback message comprise an identifier of the allocated second server.

8. The method according to claim 6, wherein determining if the allocated second server can provide the requested data in response to the request within the predetermined time period is performed by the first server using data indicative of load or waiting times at the second servers.

9. The method according to claim 1, wherein the reply and then the callback message comprise an identifier of the allocated second server.

10. The method according to claim 1, wherein determining if the allocated second server can provide the requested data in response to the request within the predetermined time period is performed by the first server using data indicative of load or waiting times at the second servers.

11. The method according to claim 1, wherein determining if the allocated second server can provide the requested data in response to the request within the predetermined time period is performed by the allocated second server using data indicative of load or waiting time at the allocated second server.

12. The method according to claim 1, further comprising closing a communication session with the client after sending the reply to the client.

13. The method according to claim 1, further comprising varying a number of the second servers based on load or waiting times at the second servers.

14. A method of communication between a client and a server system, the server system comprising a first server configured to receive requests and a plurality of second servers configured to service requests, the method comprising:
   at the client, sending a request to obtain requested data to the server system;
   allocating, by the first server, the request to one of the second servers;
   determining, by the first server or the allocated second server, if the allocated second server can provide the requested data in response to the request within a finite predetermined time period,
   when the determining steps determines that the allocated second server can provide the requested data in response to the request within the predetermined time period, sending, by the allocated second server, the requested data in response to the request to the client, and
   when the determining steps determines that the allocated second server cannot provide the requested data in response to the request within the predetermined time period:
   i) sending, by the first server or the allocated second server, a reply to the client, the reply not comprising the requested data, the reply indicating a time at which the server system can provide the requested data and comprising an information element identifying the request;
   ii) holding, at the allocated second server, the request as a pending request,
   generating, by the allocated second server, a response to the pending request, said response including the requested data as soon as the allocated second server can provide said data, and
   storing, at the allocated second server, said response together with the information element identifying the request respectively associated with said response;
   at the client, receiving the reply from the server system, the reply indicating a time when an allocated second server of the server system can provide the requested data in response to the request and comprising an information element identifying the request, the reply not comprising the requested data;
   after a period of time that is based on the time indicated in the reply, sending a callback message to the server system, the callback message not comprising the request, the callback message comprising the information element identifying the request;
   iii) receiving, at the allocated second server, the callback message from the client,
   wherein said callback message is received after the response has been generated and stored by the allocated second server; and
   iv) matching, at the allocated second server, the callback message with the generated response by comparing the information element identifying the request comprised in the callback message and the information element identifying the request respectively associated with said generated response, retrieving, based on said matching, the requested data from the generated response,
   sending, by the allocated second server, the requested data to the client; and
   receiving the requested data from the server system.

15. The method according to claim 14, wherein the time included in the reply from the server comprises at least one of:
   a minimum waiting time period;
   a time at which the server sent the reply and a minimum waiting time period;
   an actual earliest time at which a response will be available.

16. The method according to claim 14, wherein the time included in the reply indicates a latest time until which the requested data will be available and the method comprises contacting the server with the callback message before the latest time.

17. The method according to claim 14, further comprising:
   opening a communication session before sending the request to the server system;
   closing the communication session after receiving the reply from the server system; and
   opening a communication session before sending the callback message to the second server.

18. A server apparatus comprising a first server and a plurality of second servers, each of the servers comprising a processor and a memory, the memory containing instructions executable by the processor whereby the server apparatus is configured to:
   receive, at the first server, a request from the client to obtain requested data;
   allocate, at the first server, the request to one of the second servers;
   determine, at the first server or the allocated second server, if the allocated second server can provide the requested data in response to the request within a finite predetermined time period,
   when the allocated second server can provide the requested data in response to the request within the predetermined time period, sending, by the allocated second server, the requested data in response to the request to the client, and
   when the allocated second server cannot provide the requested data in response to the request within the predetermined time period:
   i) send, by the first server or the allocated second server, a reply to the client, the reply not comprising the requested data, the reply indicating a time at which the server system can provide the requested data and comprising an information element identifying the request;
   ii) hold, at the allocated second server, the request as a pending request, generate, by the allocated second server, a response to the pending request, said response including the requested data as soon as the allocated second server can provide said data, and store, at the allocated second server, said response together with the information element identifying the request, respectively associated with said response;

iii) receive, at the allocated second server, after a period of time that is based on the time indicated in the reply, a callback message from the client, the callback message not comprising the request, the callback message comprising the information element identifying the request, wherein said callback message is received after the response has been generated and sorted by the allocated second server; and iv) match, at the allocated second server, the callback message with the generated response by comparing the information element identifying the request comprised in the callback message and the information element identifying the request respectively associated with said generated response, retrieve, based on said matching, the requested data from the generated response, and send, by the allocated second server, the requested data to the client.

19. A system comprising a server apparatus comprising a first server and a plurality of second servers, each of the servers comprising a processor and a memory, and a client apparatus comprising a further processor and a further memory, the memory of each of the servers containing instructions executable by the processor of each of the servers and the further memory containing instructions executable by the further processor whereby the server apparatus and the client apparatus are configured to:

at the client, send a request to obtain requested data to a server system, wherein the server system comprises a first server and a plurality of second servers;

receive, at the first server, a request from the client to obtain requested data;

allocate, at the first server, the request to one of the second servers;

determine, at the first server or the allocated second server, if the allocated second server can provide the requested data in response to the request within a finite predetermined time period, when the allocated second server can provide the requested data in response to the request within the predetermined time period, sending, by the allocated second server, the requested data in response to the request to the client, and when the allocated second server cannot provide the requested data in response to the request within the predetermined time period:

i) send, by the first server or the allocated second server, a reply to the client, the reply not comprising the requested data, the reply indicating a time at which the server system can provide the requested data and comprising an information element identifying the request;

ii) hold, at the allocated second server, the request as a pending request, at the client, receive the reply from the server system, the reply indicating a time when the server system can provide the requested data in response to the request and comprising an information element identifying the request, the reply not comprising the requested data;

after a period of time that is based on the time indicated in the reply, send a callback message to the server system, the callback message not comprising the request, the callback message comprising the information element identifying the request;

iii) receive, at the allocated second server, after a period of time that is based on the time indicated in the reply, the callback message from the client, wherein said callback message is received after the response has been generated and sorted by the allocated second server; and iv) match, at the allocated second server, the callback message with the generated response by comparing the information element identifying the request comprised in the callback message and the information element identifying the request respectively associated with said generated response, retrieve, based on said matching, the requested data from the generated response, send, by the allocated second server, the requested data to the client; and receive the requested data from the allocated second server of the server system.

* * * * *